US006196250B1

United States Patent
Lin et al.

(10) Patent No.: US 6,196,250 B1
(45) Date of Patent: Mar. 6, 2001

(54) PRESSURE BALANCED VALVE ASSEMBLY

(75) Inventors: Tin-Kai Lin; Hung-Yin Chen, both of Taichung (TW)

(73) Assignee: Metal Industries Research Development Center, Taichung (TW)

( * ) Notice: Subject to any disclaimer, the term of this patent is extended or adjusted under 35 U.S.C. 154(b) by 0 days.

(21) Appl. No.: 09/336,562

(22) Filed: Jun. 21, 1999

(51) Int. Cl.[7] ................................................. G05D 11/03
(52) U.S. Cl. ................................................................ 137/98
(58) Field of Search ................................... 137/98, 100

(56) References Cited

U.S. PATENT DOCUMENTS

| | | | |
|---|---|---|---|
| 3,688,790 | * | 9/1972 | Esten ........................................ 137/98 |
| 4,174,726 | * | 11/1979 | Arnold et al. ......................... 137/100 |
| 5,732,729 | * | 3/1998 | Shieh ..................................... 137/100 |

* cited by examiner

Primary Examiner—Stephen M. Hepperle
(74) Attorney, Agent, or Firm—Charles E. Baxley

(57) ABSTRACT

A pressure balanced valve assembly for mixing hot water and cold water includes a body with two inlets which communicates with two respective outlets in the body, a flexible balanced member securely located between the two pairs of the inlet and the outlet. Two side members are engaged with the two inlets and each of the side members has a plurality of L-shaped inlet paths in the outside thereof and a chamber in the inside thereof, wherein the inlet paths communicate with the corresponding chamber. Two rods each have one end thereof connected to the two sides of the balanced member and the other end thereof removably received in the chamber and engagable with the inner periphery of the inlet corresponding thereto. The water entering from the inlets of the body will not impact the balanced member directly which is therefore operated precisely.

1 Claim, 4 Drawing Sheets

PRESSURE BALANCED VALVE ASSEMBLY

FIELD OF THE INVENTION

The present invention relates to a valve assembly, and more particularly, to a pressure balanced valve assembly for volumetrically mixing hot water and the cold water according to the pressure thereof in the valve assembly.

BACKGROUND OF THE INVENTION

A valve assembly for mixing the cold water and the hot water is generally employed in a pipe system connected to a faucet or a shower head so that users can get a warm water from the faucet or the shower head. The conventional valve assembly for mixing the cold water and the hot water includes a pressure balanced member which is urged at two sides thereof by two springs so that when either one of the hot water or the cold water introduces a high pressure to push the balanced member to an extreme position, the user will be incurred with the hot water with a very high temperature or the cold water with an unexpected low temperature. That is to say, the user has to adjust the lever of the faucet frequently to properly mix the volume the hot water and the cold water to let the water flowing from the shower head or the faucet have a desired temperature. In order to overcome the spring force, the water pressure has to be raised to a certain level and this prolongs the reaction time of the valve. Furthermore, the springs could reach to their fatigue critical point after a period of time and get rust. Besides, the inlet water impacts the balanced member in the conventional valve assembly directly and this makes the pressure change in the valve to be so severe that it takes time to wait for the balanced member to work normally.

The present invention intends to provide a pressure balanced valve assembly for mixing hot water and cold water automatically wherein two side members are located on two opposite sides of the body of the valve assembly and each of the side members has a curved inlet path and a chamber to dispense or eliminate the inlet force of water so that the balanced member in the valve assembly is precisely actuated. The valve assembly of the present invention effectively resolves the inherent shortcomings of the conventional valve assembly.

SUMMARY OF THE INVENTION

In accordance with one aspect of the present invention, there is provided a pressure balanced valve assembly for mixing hot water and cold water and comprising a body having two inlets in two opposite sides thereof and two outlets in the top thereof. The two inlets respectively communicate with the two outlets. A flexible balanced member is securely received in the body and located between the two pairs of the inlet and the outlet. Each of the two inlets of the body has a side member received therein and each of the side members has a plurality of curved inlet paths defined in the first side thereof and a chamber defined in the second side thereof. The chamber communicates with the curved inlet paths.

Two rods respectively extend through the two inlets of the body and are connected to the two opposite sides of the balanced member. Each of the rods has a head portion extending radially outward therefrom so as to be movably received in the chamber corresponding thereto and movably engaged with the inlet corresponding thereto.

The object of the present invention is to provide a pressure balanced valve assembly which has two side members each having a chamber and a plurality of curved paths so that the inlet water will not impact the balanced member in the valve directly and the balanced member can be operated precisely.

Another object of the present invention is to provide a pressure balanced valve assembly which has no springs received therein so as to avoid the inherent shortcomings raised by the springs.

Further objects, advantages, and features of the present invention will become apparent from the following detailed description with appropriate reference to the accompanying drawings.

DETAILED DESCRIPTION OF THE PREFERRED EMBODIMENT

Figure 1:
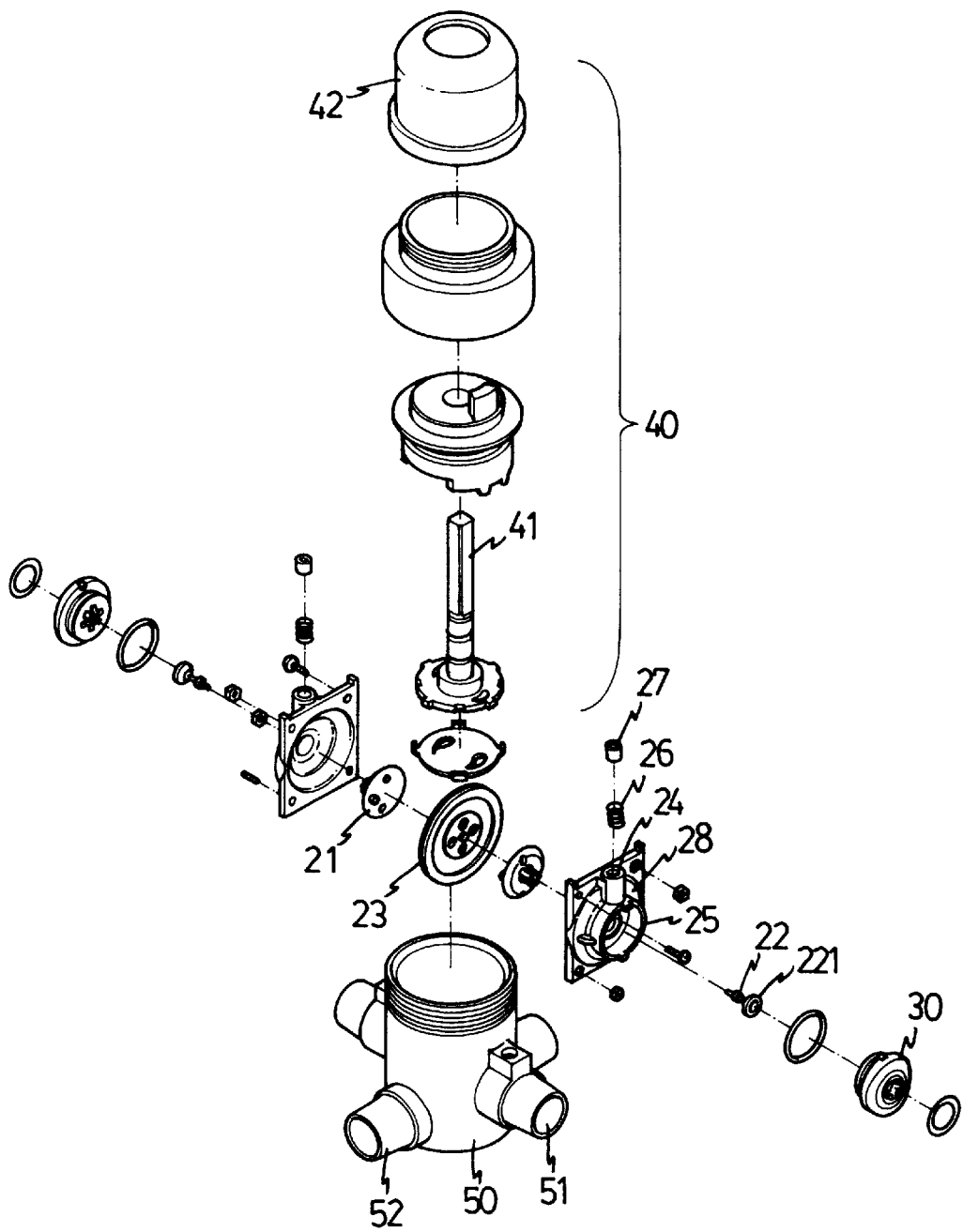
FIG. 1 is an exploded view of the pressure balanced valve assembly in accordance with the present invention.
Figure 2:
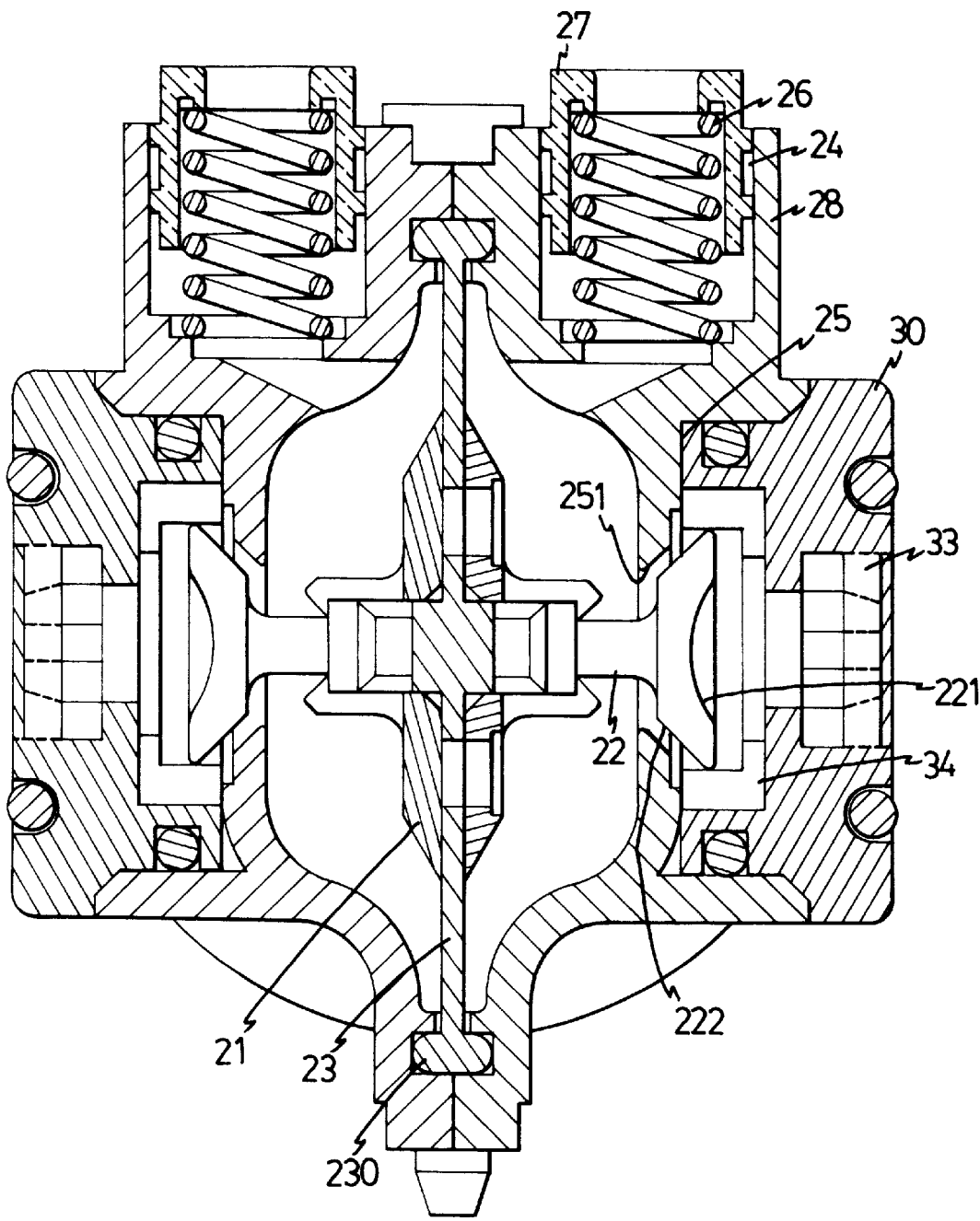
FIG. 2 is a side elevational view, partly in section, of the pressure balanced valve assembly in accordance with the present invention.
Figure 5:
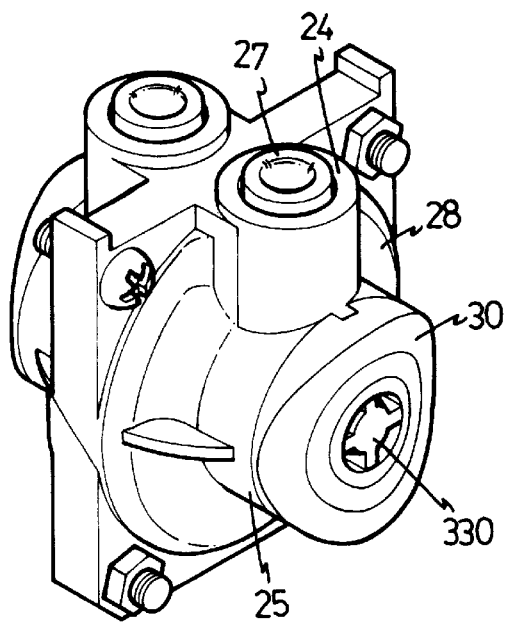
FIG. 5 is a perspective view of the pressure balanced valve assembly in accordance with the present invention.

Referring to FIGS. 1, 2 and 5, the pressure balanced valve assembly for mixing hot water and cold water in accordance with the present invention comprises a body 28 composed of two parts which are connected by bolts. Each of the parts has a tubular inlet 25 defined in a side thereof and a tubular outlet 24 defined in the top of thereof. The two inlets 25 respectively communicate with the two outlets 24. Each of the two outlets 24 has a limit tube 27 and a spring 26 respectively received therein.

A flexible balanced member 23 has a flange 230 extending laterally from the periphery thereof so as to be securely received in the body and the balanced member 23 is located between the two inlets 25 and the two outlets 24. The balanced member 23 has a plurality of apertures so that two attaching members 21 are securely attached to the two opposite sides of the balanced member 23 thereby.

Figure 4:
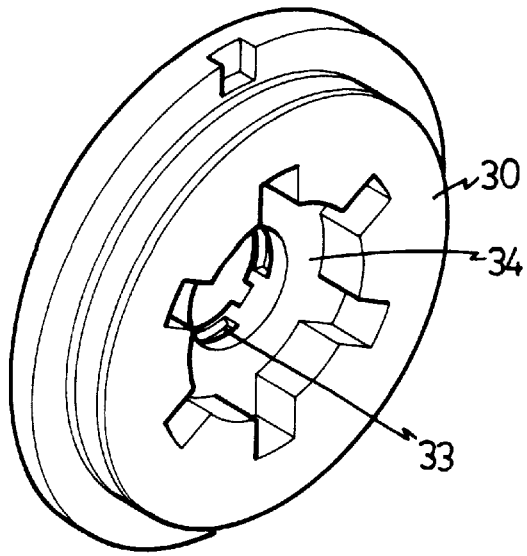
FIG. 4 is a perspective view to show the second side of the side member in accordance with the present invention.
Figure 3:
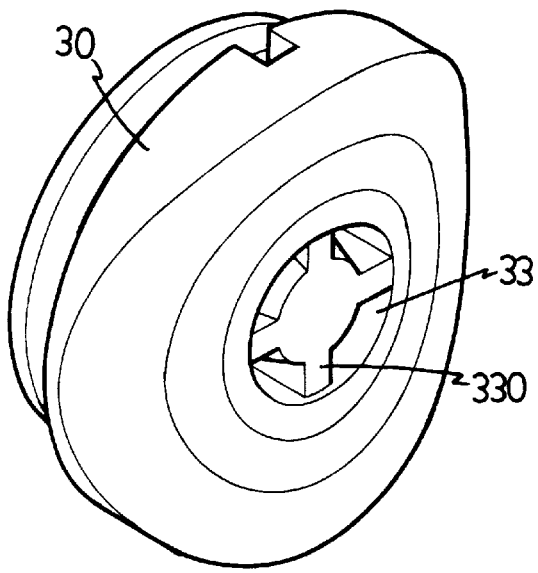
FIG. 3 is a perspective view to show the first side of the side member in accordance with the present invention.

Further referring to FIGS. 3 and 4, two side members 30 are respectively received in the two outlets 25 of the body and each of the side members 30 has a plurality of inlet paths 33 defined in the first side thereof and a chamber 34 defined in the second side thereof. The chamber 34 communicates with the curved inlet paths 33. Each of inlet paths 33 is in the form of a transverse L-shaped path and separated by a cruciform rib 330.

Two rods 22 respectively extend through the two inlets 25 of the body 28 and each of the two rods 22 has the first end thereof connected to the attaching member 21 corresponding thereto. A head portion 221 extends radially outward from the second end of each of the two rods 22. The two head portions 221 of the two rods 22 are respectively and movably received in the two respectively chambers 34 of the two side members 30 and each have a tapered periphery 222. The inner periphery of each of the inlet 25 is a tapered inner periphery 251 so that the tapered periphery 222 of each of the head portions 221 is removably engaged with the inner periphery 251 of the inlet 25 corresponding thereto.

Figure 6:
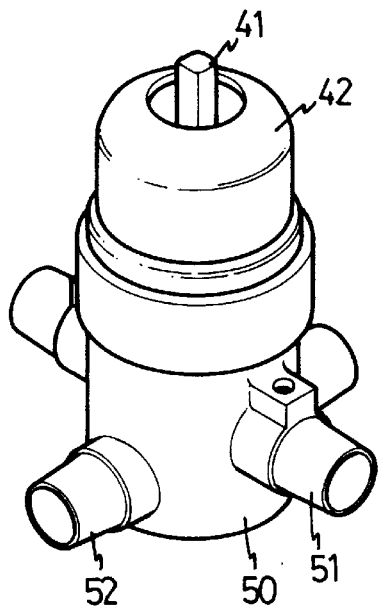
FIG. 6 is a perspective view of the pressure balanced valve assembly of the present invention with a casing mounted thereto.

Referring to FIG. 6, the body 28 is received in a casing 50 which has two inlet fittings 51 and two outlet fittings 52 so as to respectively connect to the relative pipes (not shown). A mixing mechanism 40 which is well known by the persons in the art is mounted to the top of the casing 50 with a driving shaft 41 extending from the top of the top cap 42 of the mixing mechanism 40 so as to be connected to other mechanism.

Accordingly, water flows in the valve assembly from the inlet paths 33 and into the chamber 34. If the water pressure in the chamber 34 on the left side of FIG. 2 has a larger pressure which will push the head portion 221 of the rod 22 toward the balanced member 23 so that the gap between the head portion 221 and the tapered inner periphery 251 of the inlet 25 on the left side is reduced, and the volume of the water flowing into the interior of the body 28 from the left side inlet 25 is reduced relative to the volume entering into the interior of the body 28 from the right side chamber 34. Because kinetic energy of the water entering into each of the chambers 34 runs out when flowing through the inlet paths 33 so that the pressure in each of the chambers 34 is close to a statistic pressure such that the operation of the balanced member 23 is more precise. The pressure differences in the two sides of the balanced member 23 is limited so that the hot water and the cold water entering from the two inlets 25 are evenly mixed as the users' expectation.

The invention is not limited to the above embodiment but various modification thereof may be made. It will be understood by those skilled in the art that various changes in form and detail may made without departing from the scope and spirit of the present invention.

What is claimed is:

1. A pressure balanced valve assembly for mixing hot water and cold water, comprising:

a body having two inlets defined in two opposite sides thereof and two outlets defined in a top of said body, said two inlets respectively communicating with said two outlets and having a tapered inner periphery;

a flexible balanced member securely received in said body and located between said two inlets and said two outlets;

two side members respectively received in said two inlets of said body, each of said side members having a plurality of inlet paths defined in a first side thereof and a chamber defined in a second side thereof, said chamber communicating with said inlet paths;

two rods respectively extending through said two inlets of said body and said two side members, said two rods having two respective first ends connected to two attaching members located on two opposite sides of said balanced member, each of said rods having a head portion extending radially outward from a second end thereof, each of said head portions having a tapered periphery, said two head portions movably received in said two respectively chambers of said two side members and movably engaged with said two respective tapered inner peripheries of said inlets of said body.

* * * * *